(12) United States Patent
Eberhard et al.

(10) Patent No.: US 8,311,717 B2
(45) Date of Patent: Nov. 13, 2012

(54) DRIVE LINE OPERATION METHOD

(75) Inventors: Wilfrid Eberhard, Tettnang (DE); Gerhard Hermann Martin, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 469 days.

(21) Appl. No.: 12/609,234

(22) Filed: Oct. 30, 2009

(65) Prior Publication Data

US 2010/0130328 A1 May 27, 2010

(30) Foreign Application Priority Data

Nov. 21, 2008 (DE) .......................... 10 2008 043 963

(51) Int. Cl.
*G06F 7/00* (2006.01)
*G06F 17/00* (2006.01)
*G06F 19/00* (2006.01)
(52) U.S. Cl. ................ 701/68; 701/67; 701/84; 477/76; 903/915; 903/916
(58) Field of Classification Search .............. 701/67–68, 701/84, 51, 54, 22; 477/5, 76; 192/82 R, 192/85.57, 84.1, 90, 53.2; 903/915–916
See application file for complete search history.

(56) References Cited

U.S. PATENT DOCUMENTS

| | | | |
|---|---|---|---|
| 5,954,178 A * | 9/1999 | Fischer et al. ................ 192/90 |
| 6,360,156 B1 | 3/2002 | Morganroth et al. |
| 6,561,948 B2 * | 5/2003 | Markyvech et al. ............ 477/77 |
| 6,633,806 B2 * | 10/2003 | Gochenour ..................... 701/51 |
| 7,188,018 B2 | 3/2007 | Billig |
| 2002/0087252 A1 * | 7/2002 | Shimizu et al. ................. 701/84 |
| 2002/0137595 A1 * | 9/2002 | Markyvech et al. ............ 477/77 |
| 2003/0045987 A1 * | 3/2003 | Gochenour ..................... 701/51 |
| 2006/0231305 A1 * | 10/2006 | Severinsky et al. .......... 180/65.2 |

FOREIGN PATENT DOCUMENTS

DE 41 24 722 1/1993

(Continued)

OTHER PUBLICATIONS

Design, control and test of a magnetorheological fluid fan clutch; Hu Hongsheng; Wang Juan; Cui Liang; Wang Jiong; Jiang Xuezheng; Automation and Logistics, 2009. ICAL '09. IEEE International Conference on; Digital Object Identifier: 10.1109/ICAL.2009.5262765; Publication Year: 2009, pp. 1248-1253.*

(Continued)

*Primary Examiner* — Cuong H Nguyen
(74) *Attorney, Agent, or Firm* — Davis & Bujold, PLLC

(57) ABSTRACT

A method of operating a vehicle drive train, whereby the drive train comprises a drive unit, a transmission, and an all-wheel splitter having an automatically operating clutch, positioned between the transmission and the output. The clutch is operated in a continuous slip mode and in such a way that the all-wheel splitter splits the transmission output torque for variable torque distribution to driven axles. The splitting of the output torque to the driven axles is performed by a control unit, implemented into the all-wheel drive strategy, so that the output torque, less a predetermined nominal torque, is transferred to a first axle, and the nominal torque is transferred to a second axle. When defined operating conditions are met, a limiting of the torque, set by the drive unit, and/or the nominal torque, set by the all-wheel strategy, occurs to avoid a thermal overloading of the clutch of the all-wheel splitter.

14 Claims, 2 Drawing Sheets

FOREIGN PATENT DOCUMENTS

| | | |
|---|---|---|
| DE | 101 05 321 A1 | 2/2001 |
| DE | 101 53 758 A1 | 10/2001 |
| DE | 103 33 655 A1 | 7/2003 |
| WO | 2005057039 | 6/2005 |

OTHER PUBLICATIONS

Spring-Clutch: A safe torque limiter based on a spring and CAM mechanism with the ability to reinitialize its position; Woosub Lee; Junho Choi; Sungchul Kang; Intelligent Robots and Systems, 2009. IROS 2009. IEEE/RSJ International Conference on Digital Object Identifier: 10.1109/IROS.2009.5354650; Publication Year: 2009, pp. 5140-5145.*

Temperature prediction model of wet clutch in coupling; Howon Seo; Chunhua Zheng; Wonsik Lim; Suk Won Cha; Sangchull Han; Vehicle Power and Propulsion Conference (VPPC), 2011 IEEE; Digital Object Identifier: 10.1109/VPPC.2011.6043013 Publication Year: 2011, pp. 1-4.*

\* cited by examiner

DRIVE LINE OPERATION METHOD

This application claims priority from German patent application serial no. 10 2008 043 963.0 filed Nov. 21, 2008.

FIELD OF THE INVENTION

The invention relates to a method of operating a drive train of a vehicle.

BACKGROUND OF THE INVENTION

The main components in a vehicle drive train are drive unit and a transmission, whereby the transmission converts torque and rotational speed, so that the drive unit pull force of the vehicle is provided at the drive train output.

This present invention relates to a method of operating a drive train which comprises, beside the drive unit and the transmission, an all-wheel splitter, including an automated clutch, between the transmission and the drive train output. The automated clutch of the all-wheel splitter is particularly configured as an all-wheel multiple disc clutch.

The clutch in such an all-wheel splitter, being activated automatically, is operated in a continuous slip mode and splits a transmission output torque for achieving a variable torque distribution for the output axles in a way so that the transmission output torque, less a predetermined nominal torque value based on the all-wheel drive strategy, is transferred to a first drive axle, a so called main drive axle, and the output and the nominal torque to a second driven axle, the so called auxiliary axle, being transferred from the drive train. The all-wheel drive strategy, which sets the nominal torque and hereby the variable torque distribution between driven axles and the output, is implemented in a control unit of the drive train, preferably a transmission control unit.

Strict requirements are expected from an automatic operated clutch of an all-wheel splitter, i.e., positioning accuracy, positioning dynamics, and disengaging dynamics. Because of the constant and continuous slippage present at the clutch, or the constant rotational speed difference between the output driven axles and their allocated elements of the clutch, respectively, the all-wheel splitter clutch is exposed to a high thermal and mechanical stress, which result in wear and, therefore, cause malfunctions of the all-wheel splitter clutch.

So far, there are no known measures through which improper and high thermal stress of the clutch of the all-wheel splitter is reliably avoided. Therefore, there is a need for having a method of operating a drive train, through which its clutch is protected against a thermal overload.

SUMMARY OF THE INVENTION

On this basis, this invention addresses the problem of creating a novel method for operating a vehicle drive train.

In this present invention, at the time when defined operating conditions of the drive train are met, the set torque, being provided by a drive unit, and/or the set nominal torque, being provided by the all-wheel drive strategy, is limited, avoiding a thermal overload of the clutch of the all-wheel splitter.

Through this present invention, the clutch of an all-wheel splitter is effectively and safely protected against a thermal overload. Therefore, a reliable counteracting is accomplished avoiding an early wear, and thereby a malfunction, of the clutch of the all-wheel splitter.

BRIEF DESCRIPTION OF THE DRAWINGS

Preferred, additional embodiments of the invention arise from the independent claims and the following specification.

Embodiments of the invention are explained based on the drawings, without being limited thereto. Hereby shows.

DETAILED DESCRIPTION OF THE PREFERRED EMBODIMENTS

Figure 1:
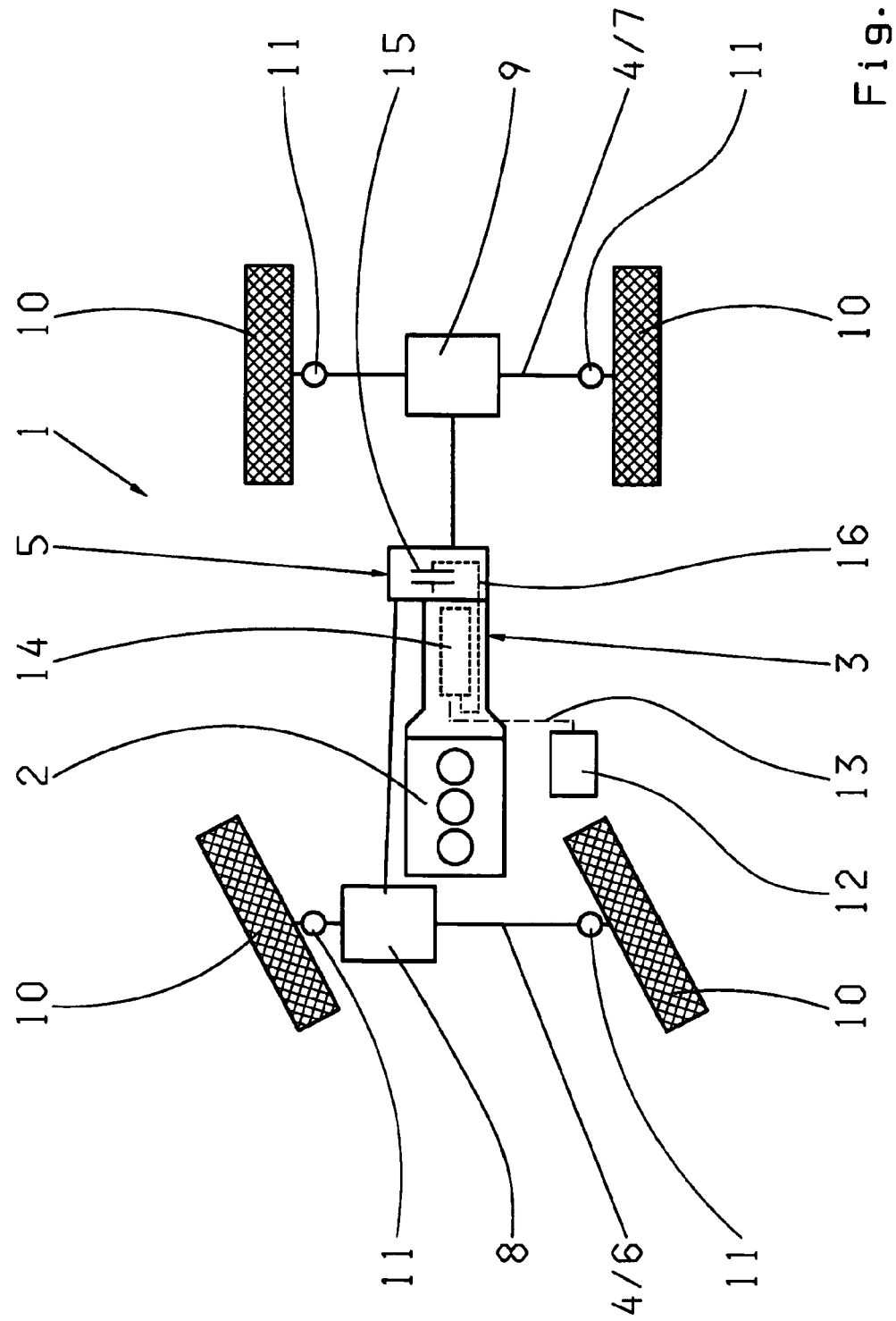
FIG. 1 is a schematic presentation of a drive train

The invention presented here concerns a method for operating a drive train of a vehicle, whereby FIG. 1 shows a schematic presentation of an embodiment of a drive train in which the invented method is used.

Here, FIG. 1 shows a schematic presentation of a drive train 1 which comprises a drive unit 2, a transmission 3 and, between an output 4 and a transmission 3, an all-wheel splitter 5 whereby the output 4, in the shown embodiment, is configured as two driven axles 6, 7. In accordance with FIG. 1, each of the two driven axles 6, 7 of the output 4 has an assigned differential 8 or 9, respectively, whereby the differential 8, 9 for both axles 6, 7, in the shown embodiment, provide a different axle drive ratio.

In addition, two wheels 10 are allocated to each axle 6, 7, whereby each of the wheels 10 has a rotational speed sensor. By the rotational speed sensors 11, the rotation of the individual wheels 10 and driven axle 6, 7 is calculated whereby, through communicating the wheel's rotational speed of one axle 6 or 7 and the allocated wheels 10, a rotational speed of each individual axle 6, 7 is calculated.

In accordance with FIG. 1, the transmission 3 has an assigned transmission control unit 12 by which the operation of the transmission 3 is controlled or regulated, respectively.

In accordance with FIG. 1, the transmission control unit 12 is coupled with a hydraulic switch group 14 of the transmission 3, by a control signal line 13, to provide control signals to the hydraulic switching group 14 for operating the transmission 3.

The all-wheel splitter 5 comprises an automatically operated clutch 15, being hydraulically activated in the shown embodiment, and hereby linked with the hydraulic switch group 14 of the transmission 3 via a hydraulic line 16. Therefore, the hydraulic switch group 14 of the transmission 3 provides, in the embodiment of FIG. 1, a hydraulic pressure for operating the clutch 15.

It is to be noted, that the automatically operated clutch 15 is also operated mechanically, electrically, or in any other way.

The clutch 15 of the all-wheel splitter 14 is operated in a continuous slip mode, whereby the clutch provides a transmission output torque of the transmission 3 for the driven axles 6, 7 of the output 4, and splits it in a variable torque allocation in a way that the splitting of the output torque of the transmission 3 for the driven axles 6, 7 of output 4 is predetermined in a transmission control unit 12 as an all-wheel drive strategy, by a default, so that the transmission output torque, less the nominal default torque being determined by the all-wheel drive strategy, is transferred to the first driven axle, i.e., axle 7, and the nominal torque is transferred to the second axle, i.e., axle 6.

At the time when the predetermined nominal torque is set at zero, the entire transmission output torque is transferred to the first driven axle, i.e., axle 7.

Figure 2:
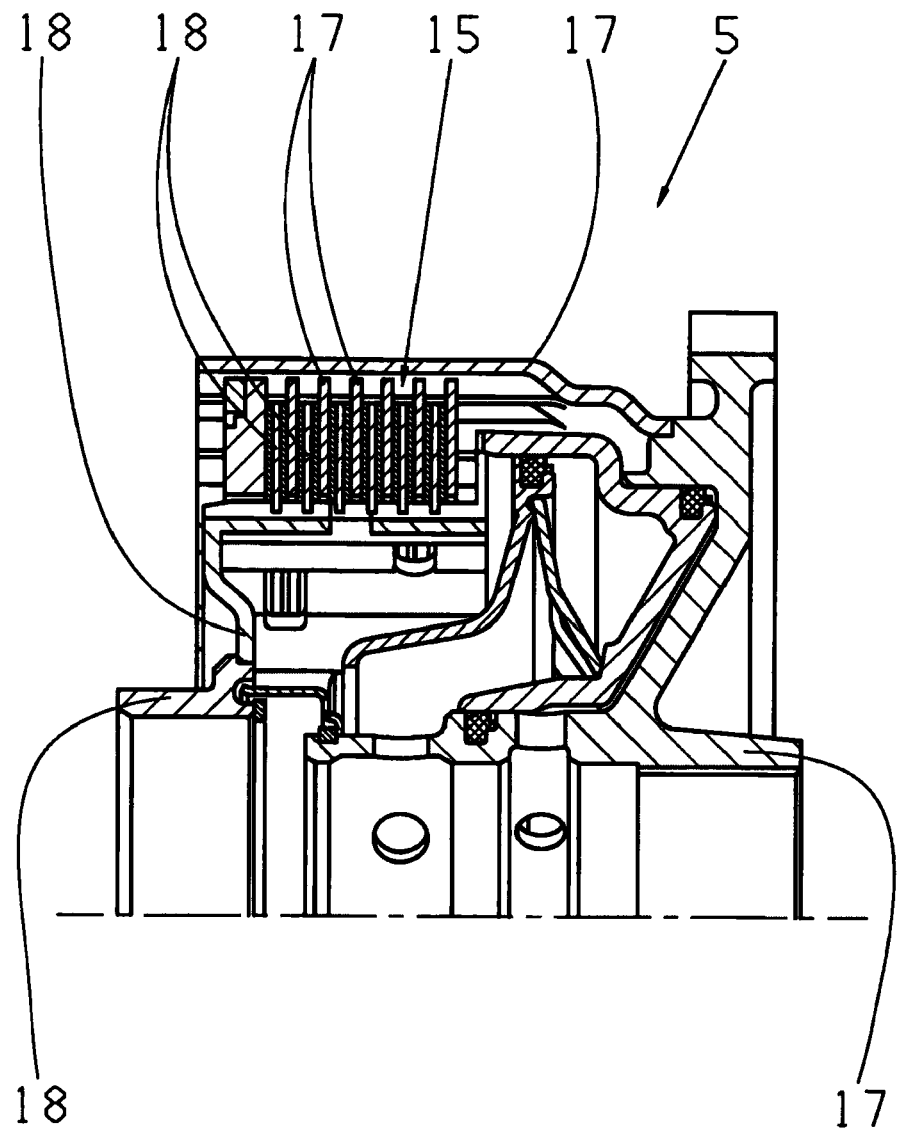
FIG. 2 is a detail of the drive train of FIG. 1

FIG. 2 is showing a detail of the all-wheel splitter 5, in the area of its automatically operated clutch 15 whereby, in accordance with FIG. 2, the clutch 15 is configured as a multiple disc clutch. The clutch 15 of the all-wheel splitter 5, is configured as a multiple disc clutch, comprises a first set of clutch elements 17 through which the transmission output torque, less the nominal torque being provided by the all-wheel strategy, is transferred to the first axle, i.e., axle 7, as well as a second set of clutch elements 18 through which the nominal torque, being set by the all-wheel strategy, is transferred to the second driven axle, i.e., axle 6, of the drive train 1.

In this invention, to protect the clutch 15 of the all-wheel splitter 5 from thermal overload, which is operated in a continuous slip mode, it is recommended that when defined operating conditions of the drive train 1 are met, a torque, being provided by the drive unit 2, and/or the nominal torque, being provided by the all-wheel drive strategy, is limited. These two measures are each applied by itself, but preferably, both measures are applied, either operating sequentially or in parallel, meaning one after the other or independently next to each other.

The torque, provided by the drive unit 2, is then limited when an amount of coolant, for cooling the clutch 15 of the all-wheel splitter 5, falls below a coolant limit value and/or when the slippage at the clutch 15 of the all-wheel splitter 5 exceeds a slippage limit value.

The available amount of coolant for cooling the clutch 15 of the all-wheel splitter 5 is mathematically calculated by the transmission control unit 12, whereby the coolant preferably comprises oil. The details of how the available amount of coolant is calculated, by the transmission control unit 12, is well known to those skilled in the art and does not require any further explanation.

The occurring slippage of the clutch 15 of the all-wheel splitter 5 is determined by the measured wheel rotation of the wheels 10 whereby, in accordance with FIG. 1, the wheel rotation of the wheels 10 is measured by the rotational speed sensors 11. From the wheel rotational speed values and the gear ratios of the differentials 8, 9, the slippage at the clutch 15 of the all-wheel splitter 5 is determined.

When the available amount of coolant falls below the coolant limit value and/or the slippage at the clutch 15 exceeds the slippage limit value, the torque is reduced by an engine control unit, not shown here, to the torque value set in the drive unit 2.

The nominal torque, being set by the all-wheel strategy, is limited when a first clutch temperature limit value of the clutch 15 of the all-wheel splitter 5 is exceeded and/or a transmission bottom temperature exceeds a first transmission bottom temperature limit value.

The temperature of the clutch 15 of the all-wheel splitter 5 is mathematically calculated whereby in case the clutch is constructed as an all wheel multiple disc clutch, the temperature of the clutch is measured at the multiple disc configuration. The transmission bottom temperature is measured by a sensor, When the temperature of the clutch 15 of the all-wheel splitter 5 exceeds the first clutch temperature limit value and/or the transmission bottom temperature exceeds the first transmission bottom temperature limit value, the nominal torque is limited by the all-wheel strategy, as previously mentioned, whereby preferably also a vehicle stabilization is activated, i.e., through an ESP-System or an ABS-System.

The limiting of the torque, being provided by the drive unit 2, works independently from the set nominal torque being provided by the all-wheel strategy. At the time, when the torque, provided by the drive unit 2, is limited on the basis of falling below the coolant limit value and/or when exceeding the clutch slippage, the nominal torque, being provided by the all-wheel strategy, remains unchanged by itself. At the time, when the torque, being provided by the all-wheel strategy, is limited based on exceeding the first clutch temperature limit value and/or exceeding the first transmission bottom temperature limit value, the torque, which is being provided by the drive unit, remains unaffected. Both operations can be running simultaneously, especially when the individual operating conditions are met cumulatively.

In an advantageous, additional embodiment of the present invention, when the temperature of the clutch 15 of the all-wheel splitter 5 exceeds a second clutch temperature limit value, which is greater than the first clutch temperature limit value, and/or the transmission bottom temperature exceeds a second transmission bottom limit value, which is higher than the first transmission bottom limit value, the clutch 15 is disengaged so that the clutch is not transferring any torque and the vehicle is being driven by just one axle. In addition, a vehicle stabilization again might be activated.

A complete disengagement of the clutch 15 of the all-wheel splitter 5 takes place only when the limitation of the nominal torque, being provided by the all-wheel drive strategy, is not sufficient to protecting the clutch 15 of the all-wheel splitter 5 with regard to a thermal overload.

At the time when one of the above measures are taken, to protect the clutch 15 of the all-wheel splitter 5 from a thermal overloading, a corresponding error condition can be recorded by an electronic control unit, i.e., into the transmission control unit 12.

REFERENCE CHARACTERS

1. Drive Train
2. Drive Unit
3. Transmission
4. Output
5. All-Wheel Splitter
6. Axle
7. Axle
8. Differential
9. Differential
10. Wheel
11. Rotational Speed Sensor
12. Transmission Control Unit
13. Control Signal Line
14. Hydraulic Switch Group
15. Clutch
16. Hydraulic Line
17. Clutch Element
18. Clutch Element

The invention claimed is:

1. A method of operating a drive train of a vehicle, the drive train comprising a drive unit, a transmission, and an all-wheel splitter having an automatically operated clutch, the all-wheel splitter being located between the transmission and first and second drive output axles, the method comprising the steps of:

directing drive unit torque from the drive unit to the transmission and controlling and converting the drive unit torque from the drive unit to transmission output torque, the transmission output torque being transmitted from the transmission to the clutch;

controlling the clutch of the all-wheel splitter to variably divide the transmission output torque into clutch output torque and nominal torque, directing the clutch output torque from the clutch to the first drive output axle and the nominal torque to the second drive output axle, the clutch output torque being the drive unit torque minus the nominal torque;

controlling the clutch with a control unit to vary the nominal torque, which is defined by an all-wheel drive strategy, such that the transmission output torque is controllably divided into the clutch output torque and the nominal torque; and dividing the transmission output torque, if defined operating conditions of the drive train are met to prevent thermal overload of the clutch.

2. The method according to claim 1, further comprising the step of:

limiting the transmission output torque with the control unit, if at least one of an amount of coolant, which cools the clutch, is less than a coolant limit value and a level of clutch slippage at the clutch exceeds a clutch slippage limit value.

3. The method according to claim 2, further comprising the step of:

limiting the nominal torque when at least one of a temperature of the clutch of the all-wheel splitter exceeds a first clutch temperature limit value and a transmission bottom temperature exceeds a transmission bottom temperature limit value.

4. The method according to claim 2, further comprising the step of:

determining the level of clutch slippage at the clutch from a measured rotational speed of at least one wheel.

5. A method of operating a drive train of a vehicle, the drive train comprising a drive unit, a transmission, and an all-wheel splitter having an automatically operated clutch, the all-wheel splitter being located between the transmission and an output, the method comprising the steps of:

providing a transmission output torque with the drive unit;

operating the clutch of the all-wheel splitter to split and variably distribute the transmission output torque to driven axles of the output;

setting and implementing the splitting of the transmission output torque for the driven axles by a control unit in an all-wheel drive strategy such that the transmission output torque, less a nominal torque, set by the all-wheel drive strategy, is transferred to a first driven axle, and the nominal torque is transferred to a second driven axle; and limiting at least one of the transmission output torque, which is provided by the drive unit, and the nominal torque, which is set by the all-wheel drive strategy, to avoid a thermal overloading of the clutch of the all-wheel, if defined operating conditions of the drive train are met.

6. The method according to claim 5, further comprising the step of:

limiting the transmission output torque, which is provided by the drive unit, if at least one of a coolant amount for cooling the clutch of the all-wheel splitter falls below a coolant limit value and a slippage at the clutch exceeds a slippage limit value.

7. The method according to claim 6, further comprising the step of:

calculating the coolant amount for cooling the clutch of the all-wheel splitter.

8. The method according to claim 6, further comprising the step of:

determining the slippage at the clutch by measuring a rotational speed of at least one wheel.

9. The method according to claim 5, further comprising the step of:

limiting the nominal torque, which is set by the all-wheel strategy, when at least one of a temperature of the clutch of the all-wheel splitter exceeds a first clutch temperature limit value and a transmission bottom temperature exceeds a transmission bottom temperature limit value.

10. The method according to claim 9, further comprising the step of:

mathematically calculating the temperature of the clutch of the all-wheel splitter.

11. The method according to claim 9, further comprising the step of:

measuring the transmission bottom temperature with a sensor.

12. The method according to claim 9, further comprising the step of:

activating additional vehicle stabilization when at least one of the temperature of the clutch of the all-wheel splitter exceeds the first clutch temperature limit value and the transmission bottom temperature exceeds the transmission bottom temperature limit value.

13. The method according to claim 9, further comprising the step of:

disengaging the clutch of the all-wheel splitter when at least one of
the temperature of the clutch exceeds a second clutch temperature limit value, which is higher than the first clutch temperature limit value, and
the transmission bottom temperature exceeds a second transmission bottom temperature limit value, which is greater than the first transmission bottom temperature limit value.

14. The method according to claim 13, further comprising the step of:

activating an additional vehicle stabilization when at least one of
the temperature of the clutch exceeds the second clutch temperature limit value, and
the transmission bottom temperature exceeds the second transmission bottom temperature limit value.

* * * * *